(12) United States Patent
Zilberman et al.

(10) Patent No.: US 6,721,820 B2
(45) Date of Patent: *Apr. 13, 2004

(54) METHOD FOR IMPROVING PERFORMANCE OF A FLASH-BASED STORAGE SYSTEM USING SPECIALIZED FLASH CONTROLLERS

(75) Inventors: Eugene Zilberman, Richmond Hill (CA); Alex Yaroshetsky, Richmond Hill (CA)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 103 days.

This patent is subject to a terminal disclaimer.

(21) Appl. No.: 10/144,985

(22) Filed: May 15, 2002

(65) Prior Publication Data

US 2003/0217202 A1 Nov. 20, 2003

(51) Int. Cl.[7] .......................... G06F 13/00; G06F 13/28
(52) U.S. Cl. .............................. 710/22; 710/23; 710/33; 710/35; 711/100; 711/101; 711/102; 711/103
(58) Field of Search .............................. 710/22, 23, 33, 710/35; 711/100, 101, 102, 103

(56) References Cited

U.S. PATENT DOCUMENTS

| | | | | |
|---|---|---|---|---|
| 5,640,349 A | * | 6/1997 | Kakinuma et al. | 365/185.33 |
| 5,812,814 A | * | 9/1998 | Sukegawa | 711/103 |
| 5,822,251 A | | 10/1998 | Bruce et al. | |
| 5,956,743 A | | 9/1999 | Bruce et al. | |
| 6,131,139 A | * | 10/2000 | Kikuchi et al. | 711/103 |

OTHER PUBLICATIONS

Winn L. Rosch, The Winn L. Rosch Hardware Bible (Third Edition), Sams Publishing 1994, Last update Oct. 13, 1999.

* cited by examiner

Primary Examiner—Rehana Perveen
(74) Attorney, Agent, or Firm—Mark M. Friedman

(57) ABSTRACT

A system and method for increasing the performance of a flash-based storage system, using specialized flash memory controller(s). Several methods of performance improvement are suggested such as adding DMA capability to flash memory controller to reduce the data transfer time; connecting flash chips to a multitude of flash memory controllers, which allow continuation of the data transfer to the system, even after the page programming operation has started; and connecting flash chips to a multitude of DMA-capable flash memory controllers to allow data transfer directly from one flash chip to another. In addition, a multi-controller design is suggested, which efficiently combines these performance-improving methods. In its best mode of operation, the present invention is a Flash-based storage system with several flash controllers or a multi-controller with DMA interface, organized in a way that reduces the page programming, page fetch and page copy time.

31 Claims, 12 Drawing Sheets

METHOD FOR IMPROVING PERFORMANCE OF A FLASH-BASED STORAGE SYSTEM USING SPECIALIZED FLASH CONTROLLERS

FIELD AND BACKGROUND OF THE INVENTION

1. Field of the Invention

The present invention relates to a system and method for using specialized flash controllers to increase the read and write performance of a flash-based storage system.

2. Description of the Related Art

Existing flash-based storage systems employ different kinds of logic to provide data and control signals to the flash array. One of the methods (which has been used by M-Systems Flash Disk Pioneers, Tel Aviv, Israel, for several years) is to have a dedicated controller that is connected from one side to the CPU data, address buses and control signals, and from the other side to the flash components to which it provides required signals. The CPU accesses the flash controller and flash array through a "window" in the memory. Read and write accesses to some addresses are decoded by the controller as accesses to its internal registers, such as configuration registers, chip selector registers, status registers or ECC registers. Accesses to others addresses are decoded as accesses directly to the flash array. For example, when a CPU wishes to perform a read operation from a particular flash chip, it a) Sets the chip selector register to point onto that particular chip;
b) Sends the read command to the selected chip (if necessary, specifying Command or Address mode in the relevant controller's registers and the writing command and/or address into the flash array window);
c) Waits for the flash chip to become Ready (to read data from it); and
d) Reads the data from the flash array window to RAM One of the limitations of this system is that when the flash array is treated as a memory-like device, the CPU cannot use "fly-by" Direct Memory Access (DMA) operations for the data transfer. Direct Memory Access (DMA) is a capability provided by some computer bus architectures that allows data to be sent directly from an attached device (such as a disk drive) to the memory on the computer's motherboard. The microprocessor is freed from involvement with the data transfer, thus speeding up overall computer operation. (Winn L. Rosch, The Winn L. Rosch Hardware Bible (Third Edition), Sams Publishing, 1994, Last update: Oct. 13, 1999) If two memory-like devices are involved in the transfer (such as flash array and RAM), "fly-by" transfer is not possible, since the system can only indicate either a Read or a Write operation at one particular time, so it can not indicate the direction of the transfer for 2 devices simultaneously. For that reason, all DMA transfers between 2 memory-like devices are "buffered": during each DMA cycle the DMA controller first reads from one device, then writes that data into the other device. When DMA transfer is between memory-like device and DMA-capable Input/Output (I/O) device, during each DMA cycle the data is read from one device and written into the other. Such operation is possible because the memory-like devices follow the system-bus Read and Write signals, while the DMA-capable I/O device knows the direction (read or write) of the transfer by other means. Clearly the "fly-by" mode is faster than the "buffered" one.

Another limitation of the existing system is that the system is idle when the flash array is in "Not Ready" state. When the flash chip with page access is given a command to read a page, it requires time for its internal processing. During this time the system cannot transfer information to or from flash, or execute other operations with it, and is therefore required to wait until the conclusion of the "Not Ready" state. Likewise, after being given a command to write a page, or erase a block, the flash chip performs internal processing, during which it is in "Not Ready" state. During this time the system can not transfer information to or from flash, or execute other operations with it, and hence is not operating at full efficiency.

Yet another limitation of the existing system is the way the data is copied. During the normal functioning of the flash storage system, some pages should be copied from one block to another block. In existing systems, data is first read from the source page into the intermediate RAM buffer, and consequently it is written into the destination page. Such a method is not fully efficient, since the data is transferred twice.

There is thus a widely recognized need for, and it would be highly advantageous to have, a system and method for adding DMA capability to the flash controller so that faster "fly-by" DMA transfers from or to the flash array will be possible.

There is a further need for a method to transfer data or otherwise continue operation of the flash system, while a flash chip is in "Not Ready" state.

There is a further need for a method to enable direct transfer of data from one flash chip into another flash chip, without necessarily being read into the intermediate RAM buffer, thus reducing the time of the copy operation.

SUMMARY OF THE INVENTION

According to the present invention there is provided a system and method for using specialized flash controllers to increase the read and write performance of a flash-based storage system.

The present invention provides solutions for the limitations described above, by describing a method to add the DMA capability to the flash controller, so that faster "fly-by" DMA transfers from or to the flash array will be possible.

In an additional embodiment, the present invention describes a method to employ several flash controllers so that while one or more flash chips are "Not Ready", others are able to transfer data or otherwise continue operation of the flash system.

In a further embodiment, the present invention describes a method to employ several flash controllers with DMA functionality so that data will be transferred directly from one flash chip into another flash chip (in one action), without necessarily being read into the intermediate RAM buffer, thus reducing the time of the copy operation.

An addition embodiment of the present invention describes a method for combining the functionality of several flash controllers into one multi-controller, which simplifies the design of the flash-based storage system.

The present invention thus consists of four primary methods. First, a way to use several flash controllers is described, so that page-programming time and page read time are effectively reduced. Secondly, there is described a DMA interface to the flash controller, which reduces the data transfer cycle. Thirdly, there is described a way to use several flash controllers so that the page copy time will effectively be reduced. Fourthly, there is provided a way to combine the functionality of several flash controllers into one multi-controller.

In its preferred mode, the present invention comprises a solid-state storage system with a plurality of flash controllers or a multi-controller with DMA interface, organized in a way that reduces the page programming and page copy time.

BRIEF DESCRIPTION OF THE DRAWINGS

FIG. 4a features the process of "read from RAM, write to flash memory", while FIG. 4b features the process of "read from flash memory, write to RAM".

FIG. 5a features the process of "read from RAM, write to flash memory", and FIG. 5b features the process of "read from flash memory, write to RAM".

DESCRIPTION OF THE PREFERRED EMBODIMENT

Figure 1:
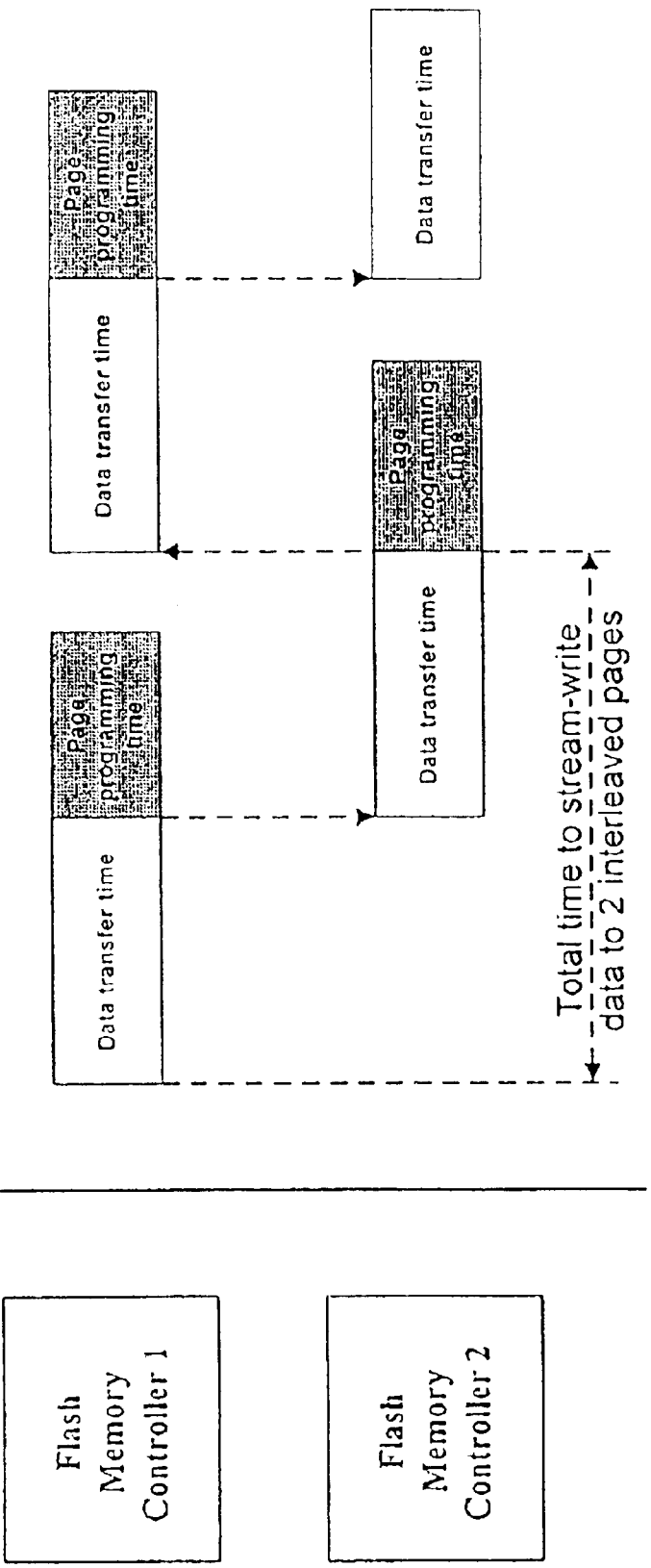
FIG. 1 illustrates the use of 2 memory controllers to enable the complete hiding of the page programming time.

The present invention is of a system and method for using specialized flash controllers to increase the read and write performance of a flash-based storage system.

Specifically, the present invention is of a system for transferring data without waiting for a flash chip to return to the "Ready" state. Furthermore, there is described a system and method for adding DMA capability to a flash controller so that faster "fly-by" DMA transfers from or to the flash array is possible. Consequently, a method is described by which a flash memory system is enabled to directly transfer data from one flash chip into another flash chip, without necessarily being read into the intermediate RAM buffer, thus reducing the time of the copy operation. Moreover, a method for combining the functionality of several flash controllers into a single multi-controller is described.

In its preferred embodiment, the system of the present invention contains at least one micro-controller (CPU), flash controller and at least one flash memory chip. The flash memory chip's control and data signals are connected to the flash controller. The CPU uses the flash controller's interface to specify which flash memory chip's control and data signals should be activated. Whenever the CPU performs Read or Write access operation, correspondingly Read or Write signals of the flash chips are activated. This scheme is commonly accepted as being simple and very convenient, however with such a scheme the CPU cannot use "fly-by" Direct Memory Access (DMA) operations for the data transfer to or from RAM. If two memory-like devices are involved in the transfer (such as flash array and RAM), "fly-by" transfer is not possible, since the system can only indicate either a Read or Write operation at any one time, so it cannot indicate the direction of the transfer for 2 devices simultaneously. For that reason, all DMA transfers between 2 memory-like devices are "buffered": during each DMA cycle the DMA controller first reads from one device, then writes that data into the other device. When DMA transfer is between a memory-like device and DMA-capable Input/Output (I/O) device, during each DMA cycle the data is read from one device and written into the other. Such operation is possible because the memory-like devices follow the system-bus Read and Write signals, while the DMA-capable I/O device knows the direction (read or write) of the transfer by other means. Clearly the "fly-by" mode is faster than the "buffered" one. This present invention describes method to add the DMA capability to the flash controller so that faster "fly-by" DMA transfers from or to the flash array are possible.

An additional embodiment of the present invention provides for a system, similar to that described above, but containing more than one flash memory chip. This embodiment addresses the limitation of systems wherein the system is idle when the flash array is in "Not Ready" state. When the flash chip with page access is given a command to read a page, it requires time for its internal processing. During this time, a typical system cannot transfer information to or from the flash, or execute other operations with it, and is therefore required to wait until the conclusion of the "Not Ready" state. Likewise, after being given a command to write a page, or erase a block, the flash chip performs internal processing, during which it is in a "Not Ready" state. During this time, a typical system cannot transfer information to or from flash, or execute other operations with it, and hence is not operating at the full efficiency. The present embodiment describes a method for employing several flash controllers so that while one or more flash chips are Not Ready, others continue the transfer of data.

An additional embodiment of the present invention improves the way in which the data is copied. During the normal functioning of a typical flash storage system, some pages should be copied from one block to another block. In existing systems, data is first read from the source page into the intermediate RAM buffer, and consequently it is written into the destination page. Such a method is not fully efficient, since the data is transferred twice, whereas a method, according to the present embodiment of the present invention, has been devised in which data is transferred one time only. This embodiment describes a method for employing several flash controllers with DMA functionality so that data is transferred directly from one flash chip to another flash chip, without necessarily being read into the intermediate RAM buffer, thus reducing the time of the copy operation.

The present invention maximizes efficiency of the flash-based storage system, according to the following embodiments:

1) According to a first embodiment of the present invention, there are provided 2 or more flash memory controllers, to reduce the system idle time by partially "hiding" the page programming time. Each 'flash memory controller' is connected to a number of flash chips. Each controller may select a specific flash chip for the purpose of sending a command, address or data to it, and also may calculate and verify Error Correction Code (ECC) syndromes.

This method requires 2 or more flash memory controllers, each connected to its own bank of flash chips. During the write operation, data is written onto the flash media attached to all the flash controllers. It is important to have several flash controllers, since each single controller at each moment may address only one flash chip, and therefore only that flash chip will receive a Chip Select signal. Since Chip Select will be removed for all other flash chips attached to that flash controller, removal of Chip Select could disrupt the write operation if it would take place on a flash chip other than the selected one.

The algorithm for executing such a system with N (N>1) flash memory controllers numbered 0 to N−1 (with data path width being equal to the number of data bits supported by a flash memory controller) is as follows:

a) Set the system to start operation with the first flash memory controller. In another words, set 'current' flash memory controller to number 0.
b) If the attached flash media is not yet in Ready state, because of a previously given page programming command, wait until the flash media becomes Ready, then optionally receive and record the status in a variable or a memory register. As soon as the flash media on the 'current' flash memory controller is ready to receive new data, start the data transfer (write to the flash media).
c) As soon as the flash media on the 'current' flash memory controller has completed receiving the new data, give it the page program command, then set the system to work with the cyclically next flash memory controller. In another words, set the 'current' flash memory controller to (CurrentNumber+1) mod N and continue the operation from paragraph b), if more data should be written.
d) After all the new data has been written, one should optionally wait for completion of the page programming operation on the flash media of every flash memory controller and optionally receive and record statuses of these operations. The page programming statuses (recorded in a variable, array of variables or memory register(s)) can be used by the data storage system to report a failed status back to the host or to retry the write operation in a different place of the flash media.

Figure 2:
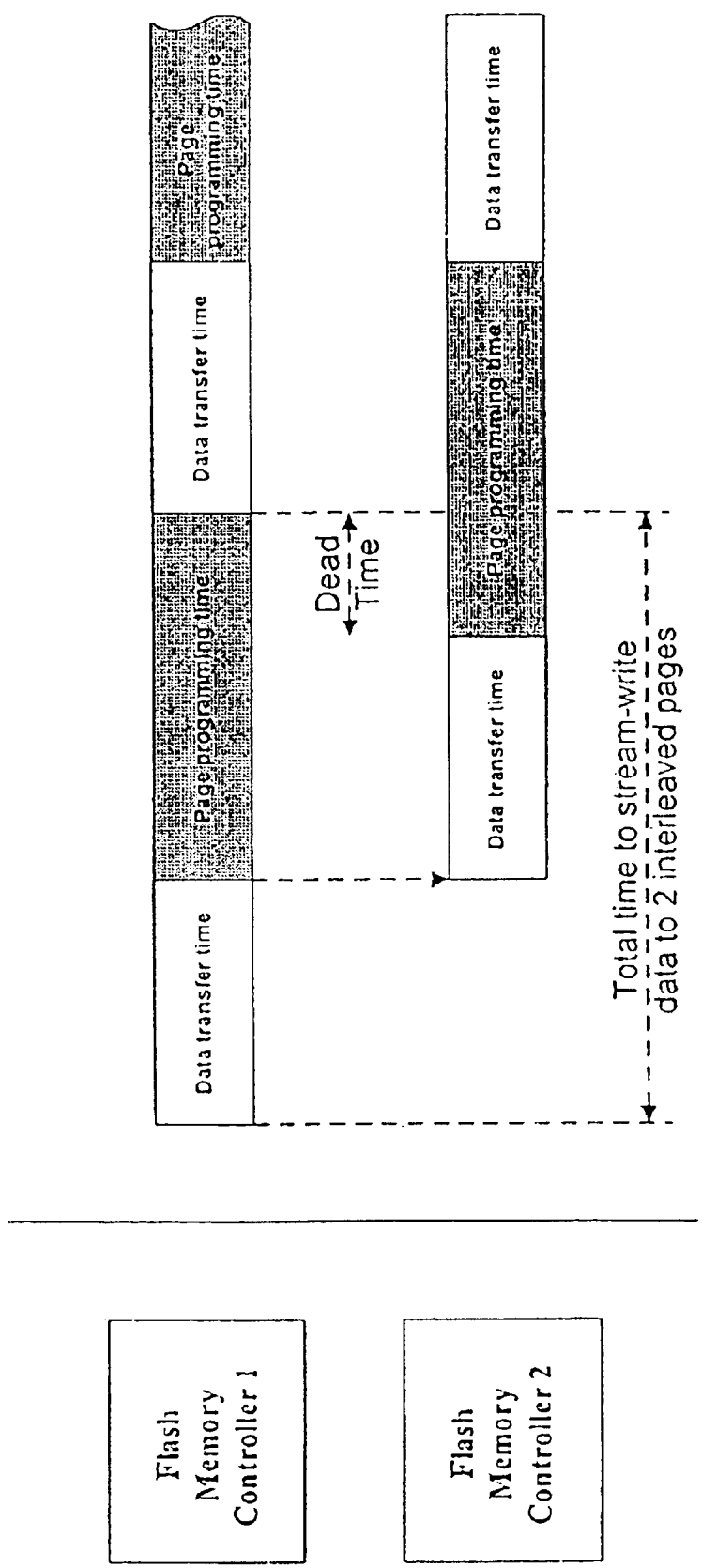
FIG. 2 illustrates the effect of the ratio of the page programming time to the data transfer time. As can be seen, the ratio is higher in this figure, so that the use of 2 memory controllers enables the partial hiding of the page programming time.
Figure 3:
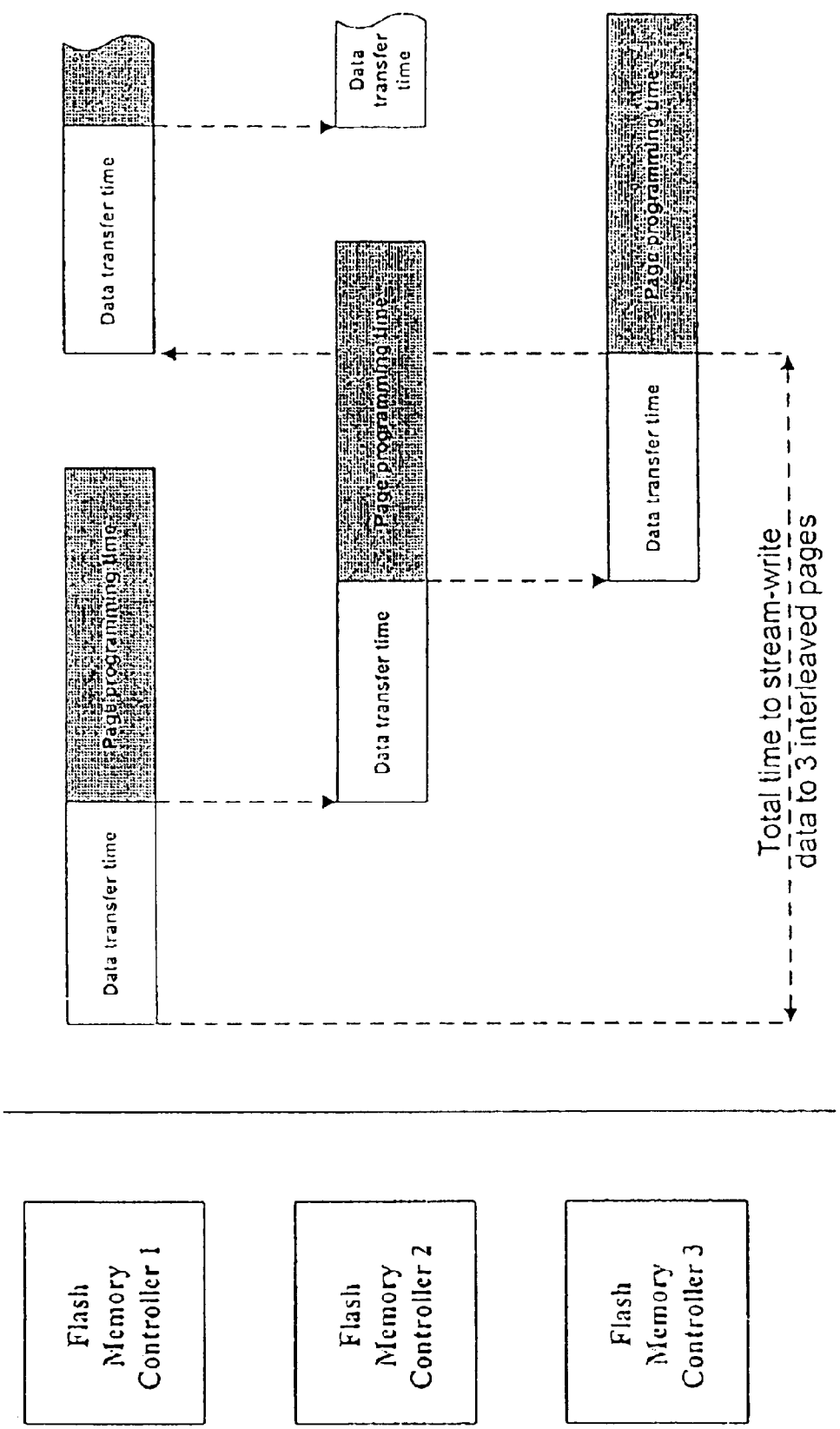
FIG. 3 illustrates the use of 3 memory controllers to allow the complete hiding of the page programming time, even though the ratio of the page programming time to the data transfer time is the same here as in FIG. 2.

The principles and operations of such an embodiment, according to the present invention may be better understood with reference to the following figures and accompanying descriptions, wherein:

FIGS. 1, 2 and 3 show different time diagrams that illustrate the above algorithm.

FIG. 1 describes the activity of flash system during the write process. The flash system includes s CPU, flash controllers, RAM, etc. The CPU sends a page program command to the first controller, and starts data transfer to the flash chip addressed by it. When the transfer of data into a particular flash page has been completed, a 'Start Programming' command is sent to that flash chip. At that moment the flash chip attached to the first controller changes its state to 'Not Ready' and begins the operation of programming data into its internal flash cells. The system, however, does not wait for the completion of that page programming operation, but sends page program command to the second flash controller and starts the data transfer to the flash chip addressed by it. This way the data transfer and page programming operations are started cyclically on the first and second controllers, so that in effect the page programming time is completely "hidden", significantly improving the performance. Moreover, in this fashion a flash data storage system can be constructed which has the write speed equal to the transfer speed of the data bus.

It is not, however, guaranteed that the data transfer time of one page would completely cover the page programming time, as shown by the "Dead Time" in FIG. 2. However in this case, the system architect can simply increase the performance by adding another flash controller to the system, as shown in FIG. 3. Here the page programming time is hidden by the time of data transfer to the other two controllers. In effect, as long as flash data storage system has 'dead' time associated with the page programming time, it can be hidden by increasing the number of flash controllers.

In the case where the data path width is a multiple of the number of data bits supported by a flash memory controller, the system is trivially generalized by interleaving several flash memory controllers on the data path. In this case, each data transfer will activate several interleaved flash memory controllers simultaneously, in an identical fashion.

Figure 8:
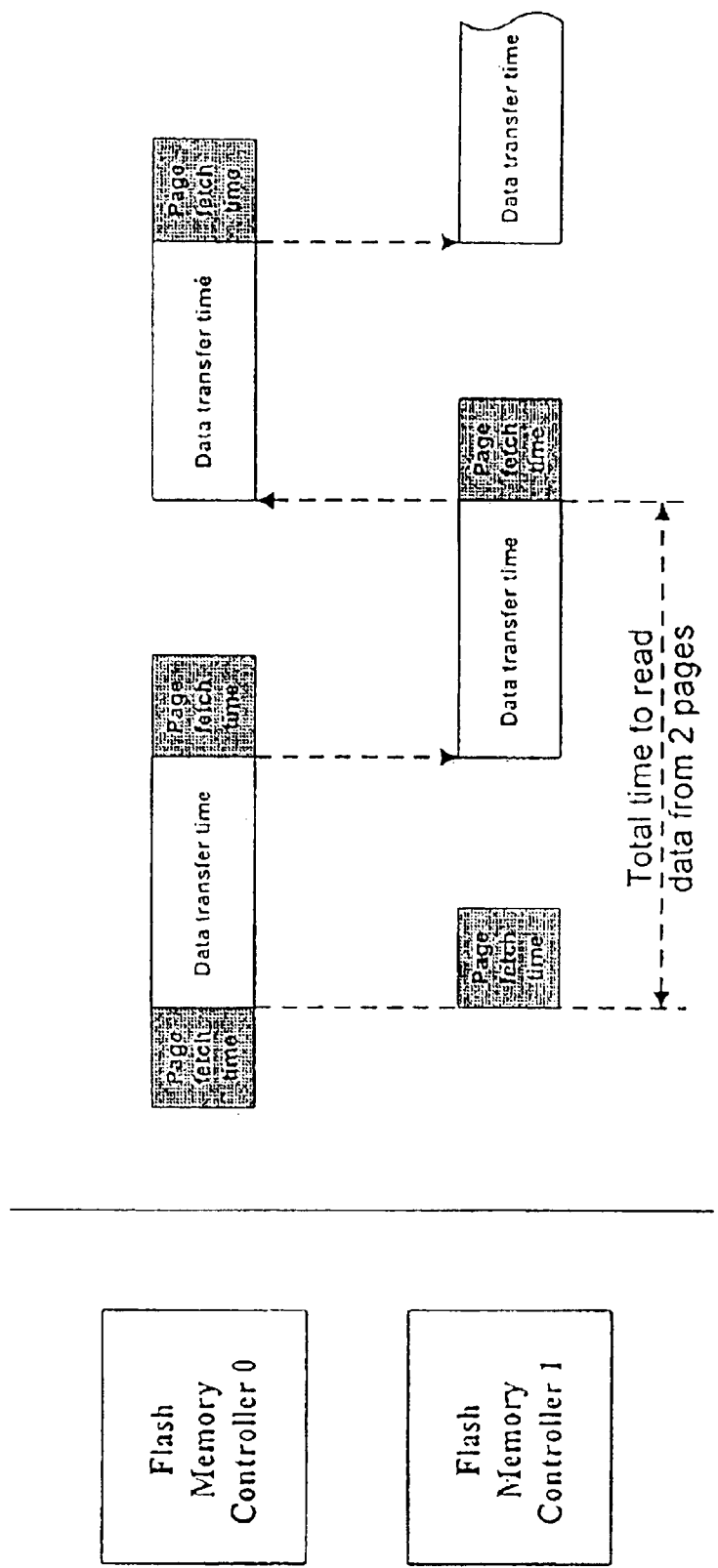
FIG. 8 illustrates the use of 2 memory controllers to allow to complete hide the page fetch time.

2) A second embodiment of the present invention entails using 2 or more flash memory controllers to hide the page fetch time. In some flash chips, the contents of a page cannot be read immediately after issuing a Read command, but only after the chip performs an internal read operation during which time the chip is 'Busy'. The page fetch time also contributes to system inefficiency, as the data transfer cannot be started until the page 'fetching' operation is complete. As illustrated in FIG. 8, a design involving several flash memory controllers allows the system to 'hide' the page fetching time similarly to the way of 'hiding' the page programming time.

The algorithm for executing such a system with N (N>1) flash memory controllers numbered 0 . . . N−1 (with data path width being equal to the number of data bits supported by a flash memory controller) is as follows:

a) Set the system to start operation with the first flash memory controller. In another words, set 'current' flash memory controller to 0, and then send a read command to the flash media attached to that controller.
b) Send a read command to the flash controller that is cyclically next after the 'current' controller, i.e. to controller with number (CurrentNumber+1) mod N.
c) As soon as the flash media on the 'current' flash memory controller is ready to transmit data, start the data transfer (read from flash media) from the 'current' flash memory controller.
d) As soon as the flash media on the 'current' flash memory controller has completed transmitting the data, optionally perform the ECC verification and correction, and then set the 'current' flash memory controller to the 'next' flash memory controller and go to paragraph b), if more data should be read.

By executing such a method, the page fetch time on the flash media attached to one flash controller is partially "hidden", by continuing data transmission from the flash media attached to the other flash controllers.

In the case when the data path width is a multiple of number of data bits supported by a flash memory controller, the system is trivially generalized by interleaving several flash memory controllers on the data path. In this case, each data transfer activates several interleaved flash memory controllers simultaneously, in an identical fashion.

3) A third embodiment of the present invention entails using at least one DMA-capable flash memory controller to reduce the data transfer time. Usually the controller, which controls/implements access to the flash memory array in CPU-based systems, is connected from one side to the CPU data, address buses and control signals, and from the other side to the flash components, to provide the required signals. The CPU accesses the flash controller and flash array via a range of addresses in its memory. Read and write accesses to some addresses are decoded by the controller as accesses to its internal registers, such as configuration registers, chip selector registers, status registers or ECC registers. Accesses to others addresses are decoded as accesses directly to the flash array. The 'DMA-capable' flash memory controller has the following additional features that a 'non-DMA-capable' flash memory controller does not possess:

i) It provides a DMA REQUEST signal, which is activated whenever the controller is ready to perform or accept the new data transfer.

ii) If the flash memory controller is capable of performing both DMA and non-DMA data transfers, it should have an internal register that allows specifying whether the following data transfers should use DMA protocol.

iii) It optionally has an internal register that allows this controller to optionally determine the direction of the data transfer by its register settings, without necessarily using CPU or micro-controller signals.

iv) Optional input of DMA ACKNOWLEDGE signal (generated by the DMA Controller), which can be used by logically generating Read/Write signals to flash chips, and/or counting the number of transfers acknowledged by DMA Controller.

v) It is optionally able to count the quantity of data being transferred. For this purpose, the controller optionally has one or more internal registers that allow setting the amount of data to be transferred before the transfer operation, and inspecting it during and/or after that operation.

vi) It is optionally able to increase the internal flash media address to or from which the data transfer it taking place; for that purpose the controller optionally has one or more internal registers which allow setting this address before the transfer operation, and inspecting it during and/or after that operation.

vii) It is optionally able to receive an external signal to terminate the transfer.

viii) It is optionally able to activate a signal (often in order to interrupt) when the transfer operation has stopped for any reason (including but not limited to the completion of the transfer).

ix) It optionally has an internal status register that may be inspected to determine the status of the data transfer, and optionally any errors encountered. This status register may optionally be written to clear 'sticky' status bits.

x) In the case where flash chips require the correct addresses to be provided during the data transfer operations, the flash memory controller optionally has an internal register that allows setting the starting address of the DMA transfer in the flash chips, and a facility to provide the flash chips with addresses during the DMA transfer. The address provided to the flash chips is incremented after each DMA transfer cycle, beginning from the starting value provided in the register.

xi) Alternatively, in the case where flash chips require the correct addresses to be provided during the data transfer operations, the RAM buffer, which is the destination or source of fly-by DMA data transfer operation, should be located in such a system's addresses, such that values on the address bus, which are generated by the DMA controller during the transfer, address the correct locations in the flash chips.

The data transfer cycle between RAM and non-DMA-capable flash memory controller consists of at least 2 operations: one read (from the source) and one write (to the destination). This data transfer cycle can be performed by the CPU, in which case the data is temporarily stored in a CPU register. Alternatively the data transfer cycle can be performed by some DMA controller in the 'buffered' mode, in which case the data is temporarily stored in the DMA controller internal register(s) (the DMA controller can be implemented as a part of a CPU, chipset or other control logic). In both cases, the data transfer cycle requires 2 operations: one read and one write, since the system can only indicate either Read or Write operation at one time, so it cannot indicate the direction of the transfer for two devices simultaneously. In contrast, the data transfer between RAM and DMA-capable flash memory controller may require only one ("fly-by") operation, during which the data is being read from the source and simultaneously written into the destination. Such operation is possible because RAM follows the system-bus Read/Write signal(s), while the DMA-capable flash memory controller knows the direction of the transfer (read or write) indicated through its additional register(s), and it will generate appropriate signals for the flash chips attached to it. Since the Read and Write operations usually take about the same time, the "fly-by" transfer cycle is usually about twice as fast than the "buffered" one.

Figure 4A:
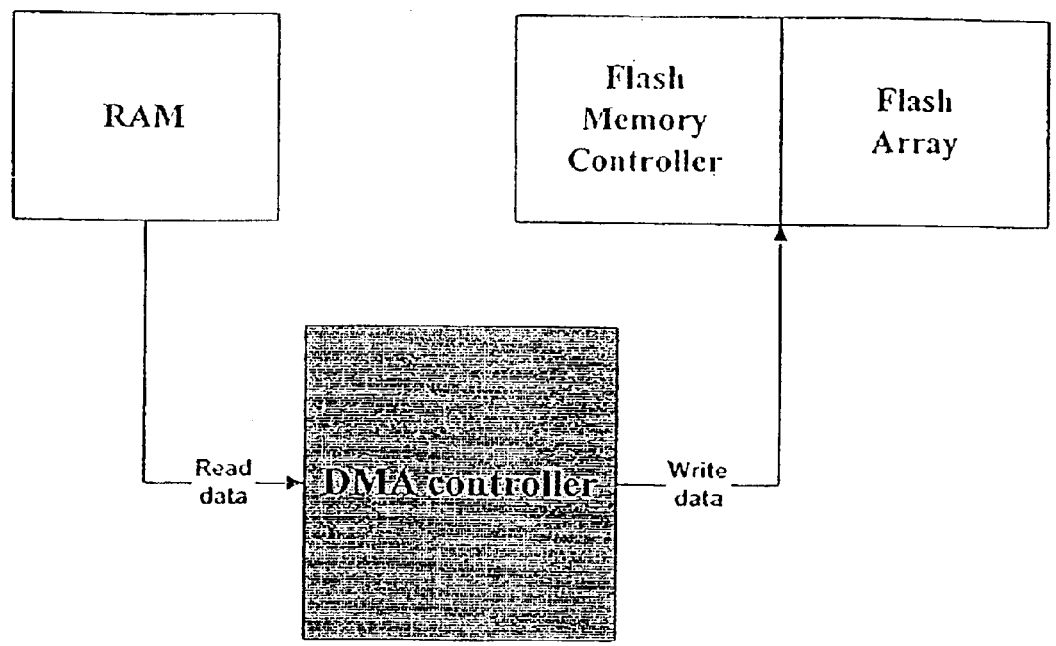
FIGS. 4a and b are schematic drawings of a data transfer cycle between the memory and non-DMA-capable flash memory controller.

FIGS. 4a, b show the read and write data transfer cycle between the memory and non-DMA-capable flash memory controller. As can be seen in FIG. 4a, the process of transferring data from RAM to the flash array involves two stages: during the first stage the data is read from RAM into internal DMA controller's register(s), and during the second stage, the data is written from the internal DMA controller's register(s) in to the flash array. Similarly, FIG. 4b describes the action of transferring data from the flash array into RAM which also involves two stages: first the data is read from the flash array into internal DMA controller's register(s) and second the data is written from the internal DMA controller's registers into RAM.

Figure 4B:
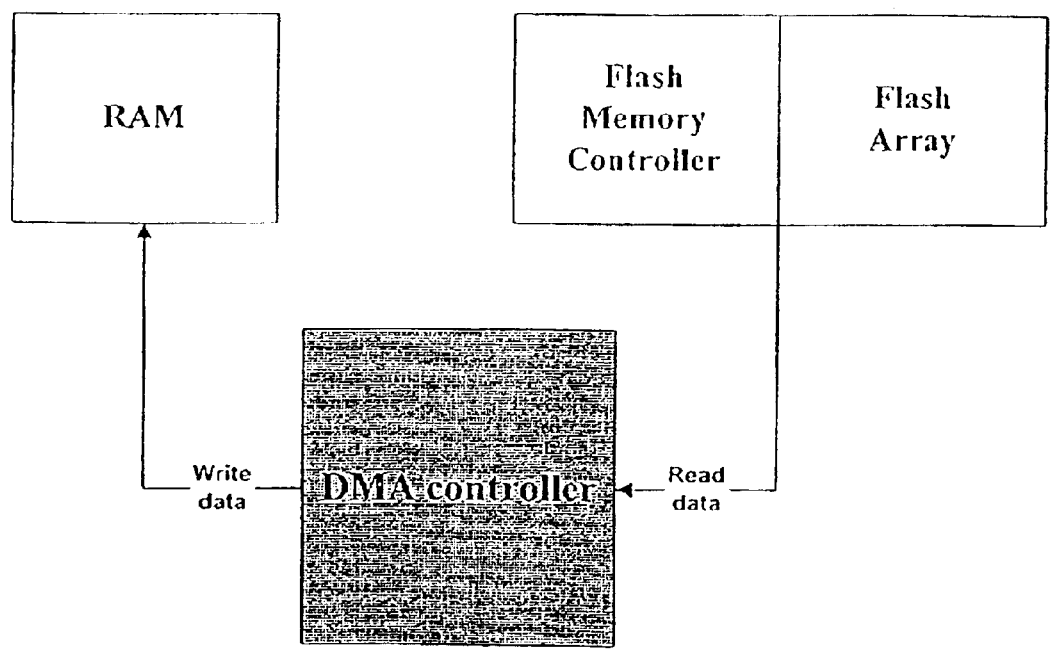
Figure 5A:
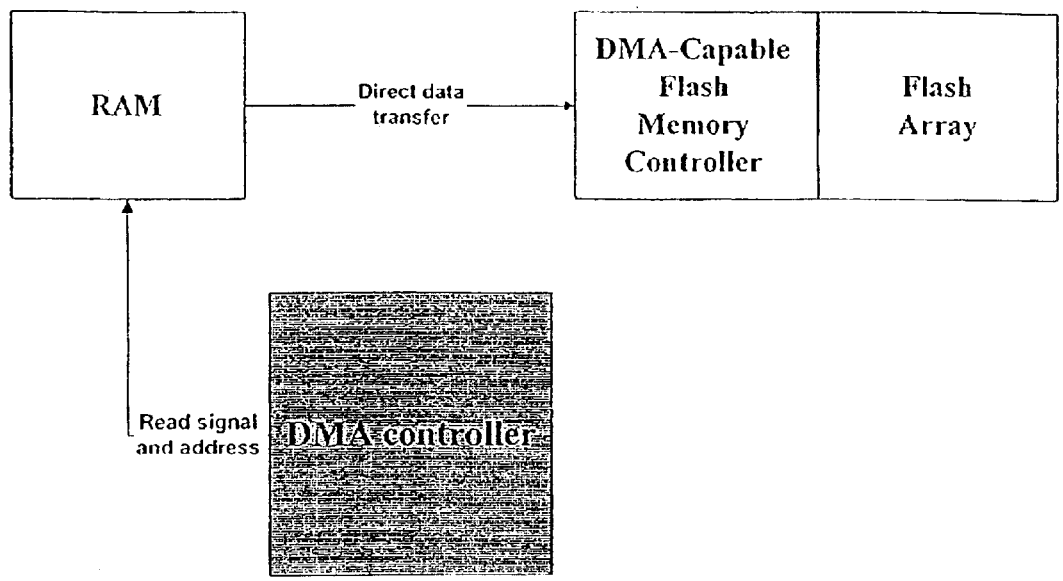
FIGS. 5a and 5b are schematic drawings of a data transfer cycle between the memory and DMA-capable flash memory controller.
Figure 5B:
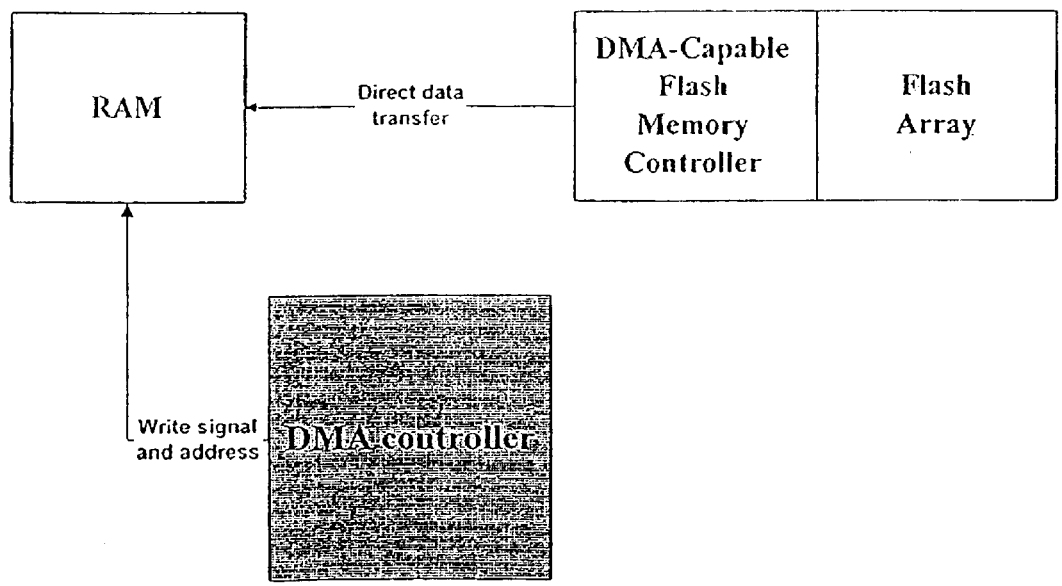

FIGS. 5a, b show the read and write data transfer cycle between the memory and DMA-capable flash memory controller, for comparison with FIGS. 4a and 4b respectively. As can be seen in FIG. 5a, the process of transferring data from RAM to the flash memory involves only one stage: it is read from RAM (by activating system's Read signal) and when the data is put onto the data bus it is directly written to flash memory, without being stored intermediately in DMA controller's registers. The necessary Write signal to the flash memory is generated internally by the DMA-capable flash memory controller's logic. Similarly FIG. 5b shows that the process of transferring data from the flash memory to RAM involves only one stage: it is read from the flash memory, and when the data is put onto the data bus, it is directly written to RAM, without being stored intermediately in DMA controller's registers.

4) A fourth embodiment of the present invention provides for a DMA-capable flash memory controller to transfer data directly from a flash chip attached to one flash memory controller to a flash chip attached to another flash memory controller. Often the flash system software needs to copy data from one block of flash media to another block of flash media, as a part of flash memory management process. Normally this consists of:

i) Sending a Read command to the flash chip, which will be the source of data;
ii) Waiting for the data to become available (page fetch time);
iii) Reading the data into memory;
iv) Writing the data into the destination flash chip;
v) Sending a page program command to the destination flash chip; and
vi) Waiting until the destination chip has completed its page programming (page programming time).

The use of DMA-capable flash memory controllers enables data transfer operations without intermediately storing it in memory, thus significantly reducing the data transfer time. One of the flash memory controllers acts as a memory-like device, while other acts as DMA Requestor.

In addition to reducing the data transfer time by copying data directly from one flash chip to another flash chip, several DMA-capable flash memory controllers can be used to partially or completely hide the page programming and/or page fetch time, in a manner similar to described in preferred embodiments 1 and 2.

The optimal performance of the system is achieved when the system is constantly transferring data into or out from the flash chips. Since a flash chip cannot receive new data while it is busy with page programming, and cannot produce data while it is busy with page fetching, the goal according to the present invention is to arrange the page fetch phase, data transfer phase and the page programming phase among several flash memory controllers, in such a manner so that the page fetch phase and page programming phase always overlap with the data transfer phase.

For two DMA-capable flash memory controllers it is not possible to completely overlap data transfer phases with page programming and fetching phases, because after the page transfer will be completed, the flash chip which received the data will become busy for the duration of the page programming time.

If, however, the number of DMA-capable flash memory controllers is larger than two, the data transfer stage of some flash memory controllers can overlap with the page programming time or page fetch time of other flash memory controllers. In this way, these inefficient programming or fetch page times can be completely or partially hidden, similarly to that described in the $1^{st}$ and $2^{nd}$ preferred embodiments above.

Figure 6:
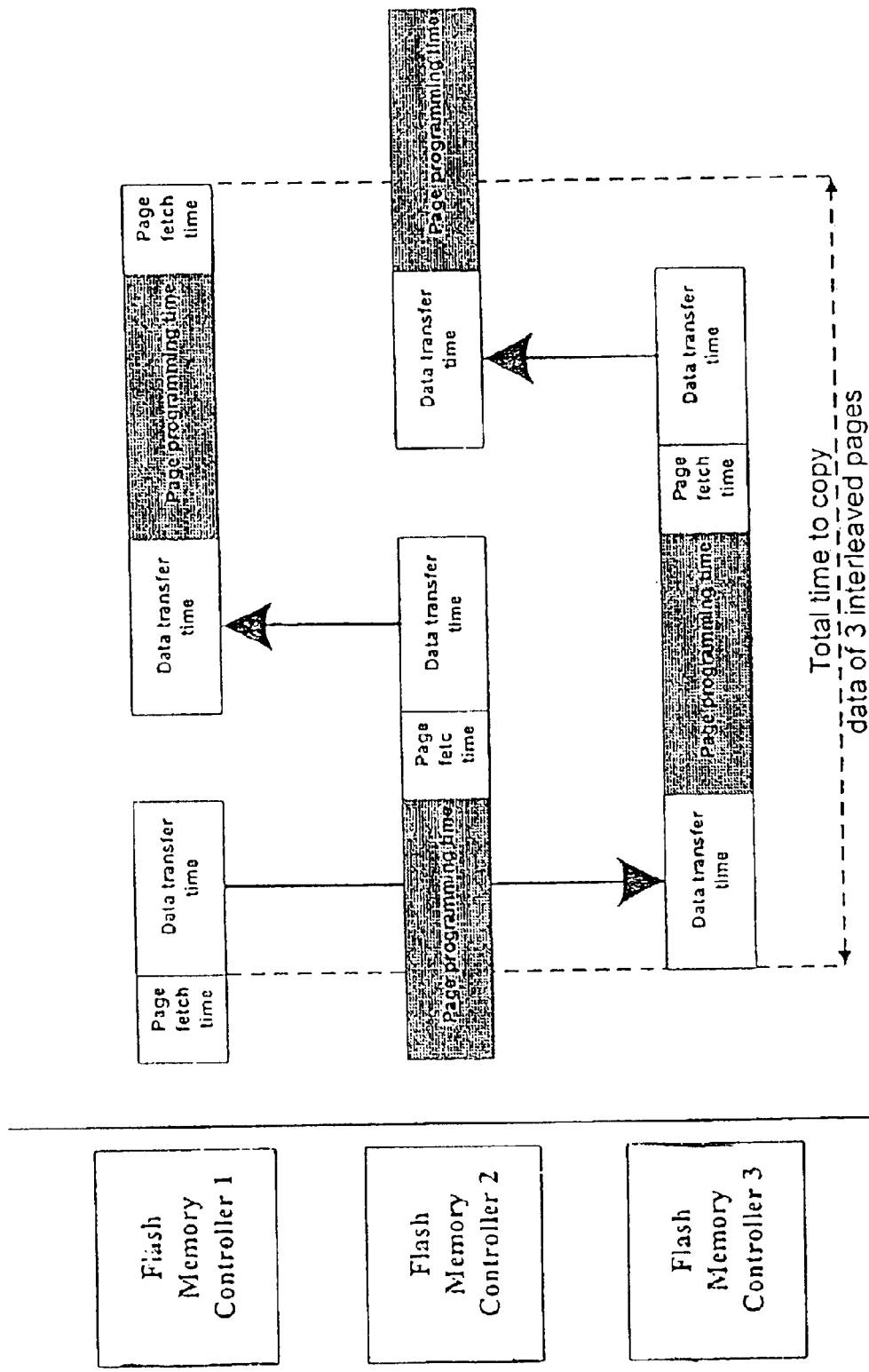
FIG. 6 illustrates a copy operation using 3 DMA-capable flash memory controllers. The ratio of the page programming time to the data transfer time is so that page programming time is only partially hidden.
Figure 7:
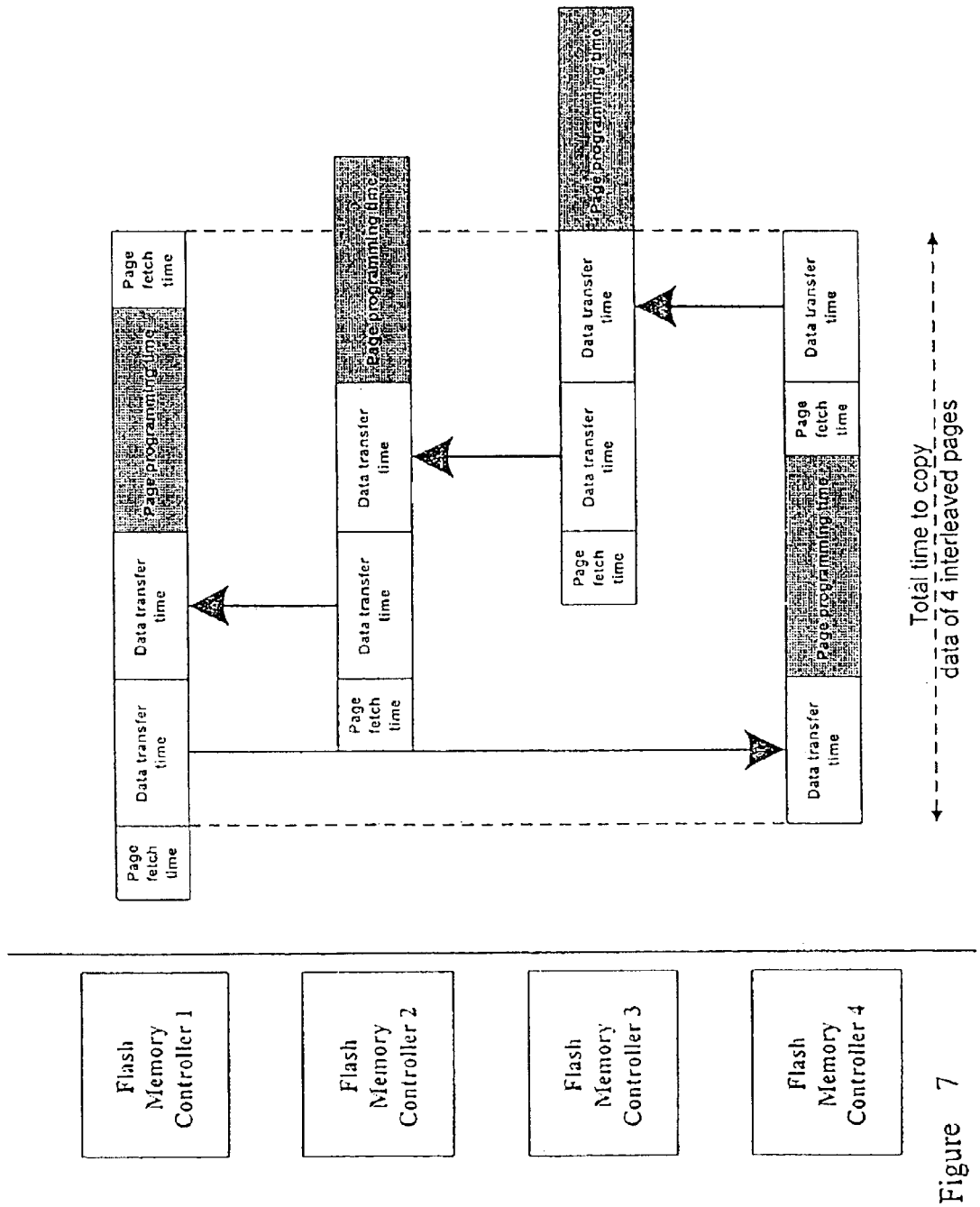
FIG. 7 illustrates a copy operation using 4 DMA-capable flash memory controllers, which completely hides the page programming time.
Figure 9:
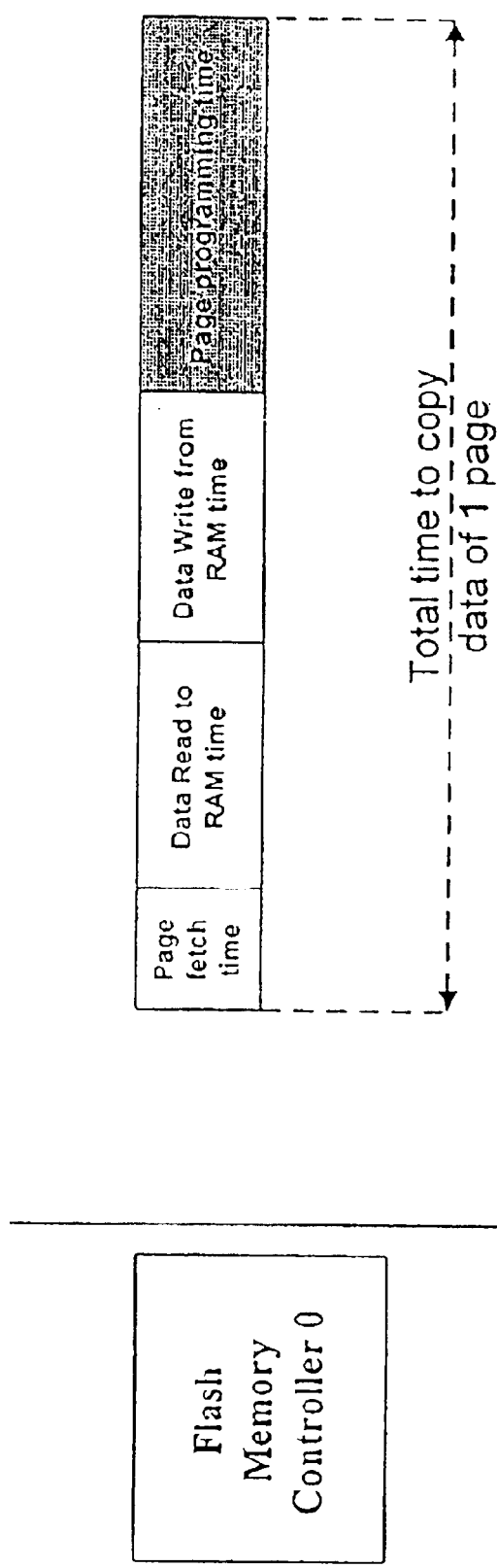
FIG. 9 illustrates traditional copy operation using 1 flash memory controller, in which Data Read time does not overlap with Data Write time, page programming time and page fetch times either are not overlapped.

FIGS. 6 and 7 demonstrate the copy operation between respectively 3 and 4 DMA-capable flash memory controllers. In contract with 'traditional' operations (described above and illustrated in FIG. 9) the performance is significantly improved by:

a) Having data transfer time common between two flash chips (source and destination), instead of having separate read from the source time and write to the destination time.

b) Overlapping the data transfer time with page programming and/or page fetch time, thus reducing the 'dead' time of the system.

One of the possible schemes in assigning read and write operations between N (N>2) DMA-capable controllers is as follows:

a) At any moment two flash memory controllers are designated as 'from' and 'to' for the purpose of the following data transfer operation.
b) System starts with 'from' flash memory controller set to 0, and 'to' flash memory controller set to N−1. Send a read command to the flash media attached to 'from' controller.
c) If the 'from' flash memory controller is in page programming phase, wait until its completion, i.e. until the attached flash media becomes Ready, then optionally retrieve and record its status.
d) If the flash media attached to 'from' controller has not yet been sent a 'read' command, send it now.
e) As soon as the flash media on the 'from' flash memory controller is ready to transmit data, start DMA data transfer from the 'from' to 'to' flash memory controllers, and wait for DMA completion.
f) Optionally record the information regarding the original layout of the data (also see below).
g) Set 'to'='from', and set 'from' to the cyclically next number, or 'from'=('from'+1) mod N.
h) If there is more data to copy, then go to paragraph c).
i) After all the data has been written, one should optionally wait for completion of the page programming operation on the flash media of every flash memory controller and optionally receive and record statuses of these operations.

This scheme can be made more efficient if the 'read' command will be given to the flash media immediately after the page programming stage has completed.

Flash system software should be able to cope with the fact that some of the data which was previously written on the flash media of one flash memory controller after such an operation, will reside on the flash media of another flash memory controller. Towards that end, one can optionally add a control flag to the information stored in each page or logical block. This flag should allow the flash system software to deduce the 'original' layout of the data, which is required when the data is requested by a user. The simplest example of such a flag is the number of DMA-copy operations that were performed on the block of data spliced upon N flash memory controllers. If, at the value zero of that flag, data is distributed between N flash memory controllers 0, 1, 2 . . . N−1, then at value of the flag x, if the above copying scheme has been used, the data will be distributed between N flash memory controllers as x, x+1, x+2 . . . (cyclically through N−1) . . . x−1.

5) A fifth embodiment according to the present invention describes how the functionality of several flash memory controllers can be effectively combined into one multi-controller. This multi-controller enables hiding the page fetch and programming times, and transfers data directly from one flash memory controller to another flash memory controller.

Figure 10:
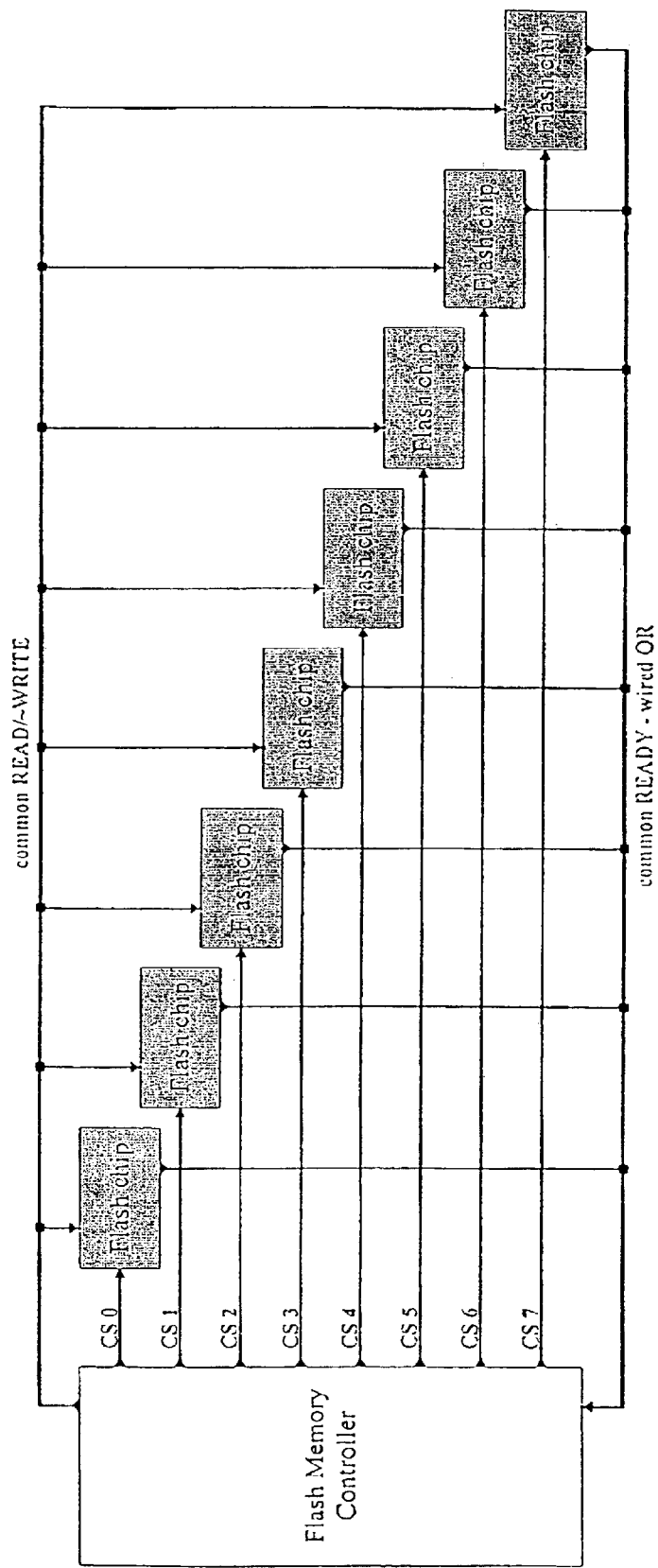
FIG. 10 illustrates a signal attachment of the traditional flash memory controller to flash chips.

In the existing flash controller technology, all attached flash chips share the same data and control signals, with the exception of the Chip Select signal. Whenever a read or write signal is activated, only the flash chip in which the Chip Select line is active at that time will execute the read or write operation. Also, the Ready signal of different chips is combined in such a way, so that if any one chip is Not Ready, the controller will indicate a 'Not Ready' state. An example of such system is shown in FIG. 10. Such a connection is simple and convenient, but it does not allow performance of simultaneous and different operations on different flash chips. Simultaneous and different flash operations of different chips can be made possible either by attaching them to separate flash controllers (as described in previous embodiments) or by designing a special/different kind of flash memory controller (here called multi-controller).

The proposed flash memory multi-controller may have the following options:

i) It has two separate Chip Selector registers, and has ability to simultaneously activate two different Chip Select signals (the total number of Chip Select signals is equal to the number of attached flash chips).
ii) It has more than one Read/Write output signal, so it has the ability to activate a Read/Write signal to a specific selected chip(s), and not to all attached chips at the same time.
iii) It optionally has the ability to activate two different Read/Write signals to the different selected chips.
iv) 'Ready' indicator in the register may reflect only the signal of one specific selected flash chip, not all attached flash chips.
v) Includes features of the DMA-capable flash memory controller, as described in the third embodiment, such as DMA Request and Acknowledge signals, configuration, status and control registers.

Such multi-controller allows the reduction of the system idle time by partially "hiding" the page programming time, similar to the first embodiment (1), to reduce the page fetch time, similar to the second embodiment (2), to reduce the transfer time by using DMA interface similar to the third embodiment (3), and to transfer data directly from one flash memory controller to another flash memory controller, similar to the fourth embodiment (4).

Figure 11:
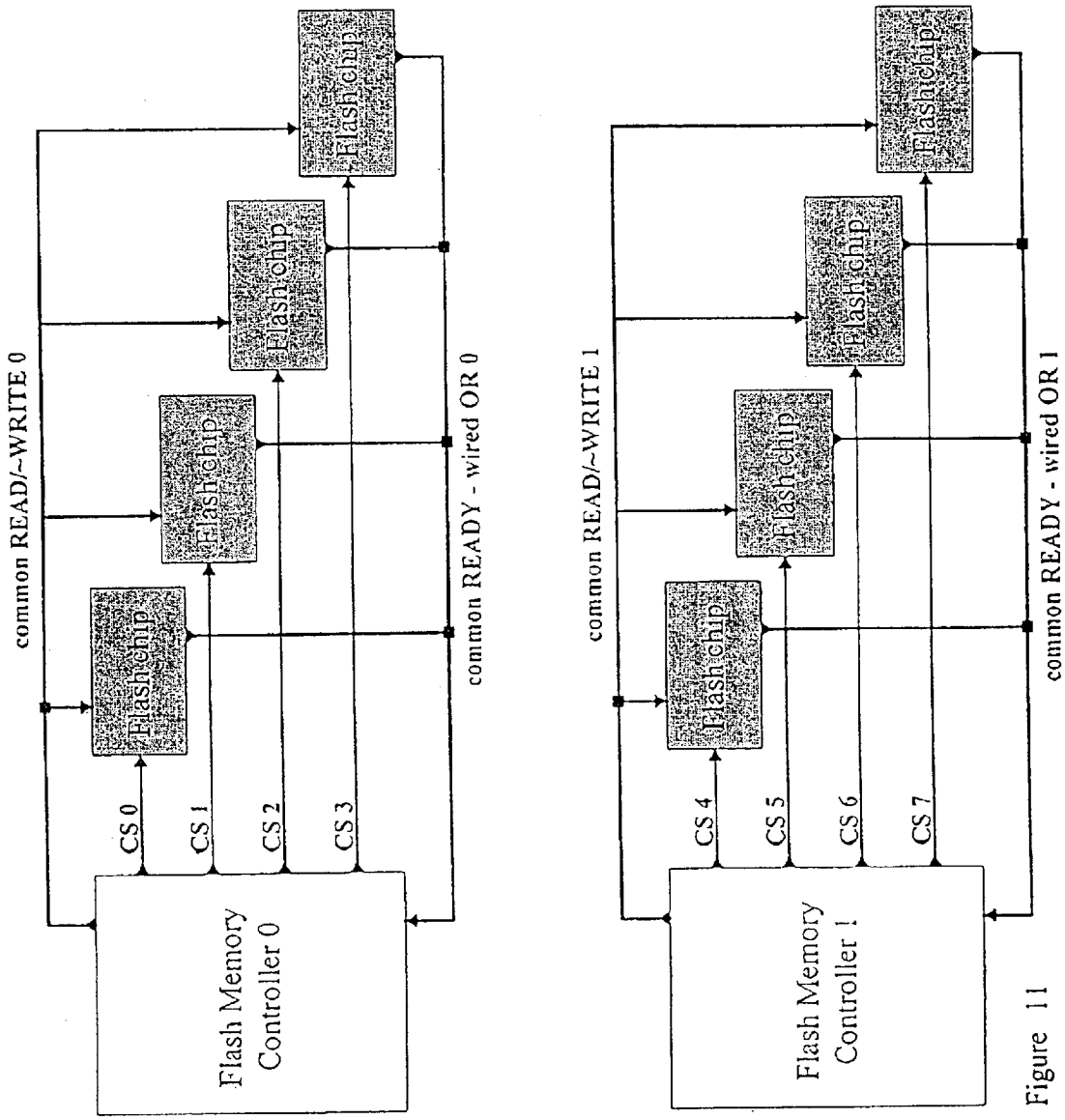
FIG. 11 illustrates signal attachment in the system of several traditional or DMA-capable flash memory controllers.

An important parameter of the multi-controller is the number of Read/Write signals it generates. If a system is built with several (N) simple flash memory controllers (as shown on the FIG. 11), its number of Read/Write signals will also be N, and it can address the attached flash chips through N independent banks, whereas each flash chip always belong to the same bank. The DMA transfer from one flash chip to another flash chip may only take place if these chips are located on different banks.

Figure 12:
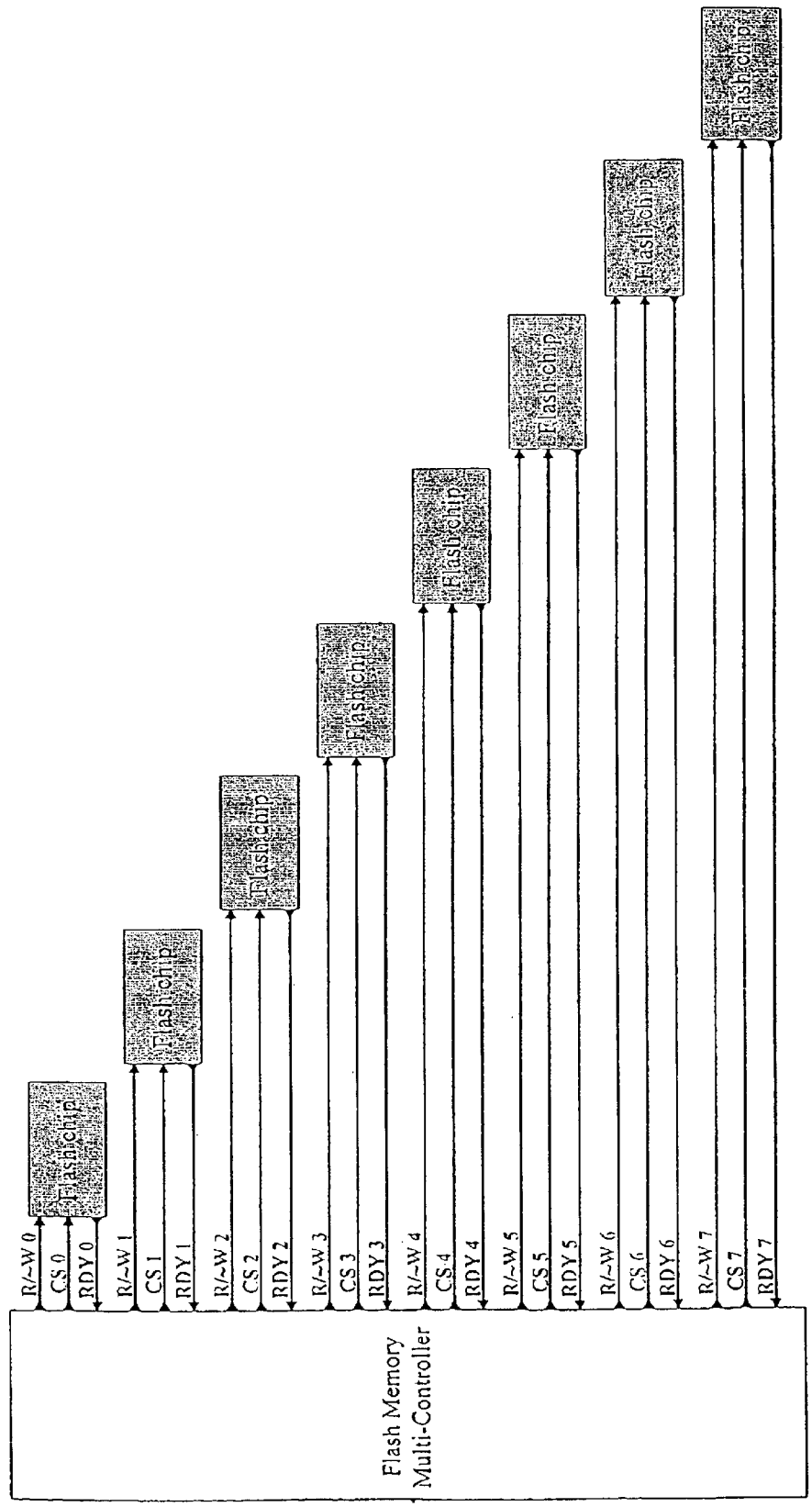
FIG. 12 illustrates signal attachment in the system with multi-controller.

In comparison, a multi-controller system may have a separate Read/Write signal for every attached flash chip, as shown on FIG. 12. In this case the number of independent banks in this system is in effect equal to the number of flash chips, and the system is free to sub-divide these flash chips onto any number of 'virtual' banks for its convenience. Also, DMA transfer from between any two flash chips can take place, regardless of such subdivision.

(There are other flash control signals in addition to Read/Write or Chip Select, but their level is only important while a Read or Write operation is taking place. Therefore these signals can be made common for all flash chips and the activation of these signals can be coordinated with activation of Read/Write and/or Chip Select signals for different banks)

While the invention has been described with respect to a limited number of embodiments, it will be appreciated by someone ordinarily skilled in the art that many variations, modifications and other applications of the invention may be made.

What is claimed is:

1. A system for improving data transfer performance in flash storage media, comprising:
   i. at least one flash memory chip for storing data;
   ii. at least one a flash controller for controlling said flash memory chips, said flash controller having a DMA interface comprising an output DMA REQUEST signal, which is active whenever the system is ready to execute DMA data transfer; and
   iii. at least one micro-controller for activating said flash memory chips and said flash controller's control and data signals.

2. The system of claim 1, where said DMA-capable flash memory controller further comprises a facility that determines the kind of operation performed on the attached flash chips, by inverting operation taking place on the system bus during a DMA data transfer.

3. The system of claim 1, wherein said DMA-capable flash memory controller further comprises a facility that determines the kind of operation performed on the attached flash chips, according to a value written into a control register of said flash memory controller.

4. The system of claim 1, wherein said DMA-capable interface for said flash controller enables fly-by data transfers by providing said DMA REQUEST signal to a DMA controller and by providing the kind of operation to said flash chips participating in said data transfers.

5. The system of claim 1, wherein a RAM buffer is a participant of said data transfer, said RAM buffer being located in the system's addresses, such that values on an address bus, which are generated by said DMA controller during said data transfer, address the correct locations in said flash chips.

6. The system of claim 1, wherein said DMA-capable flash memory controller further comprises a facility for providing said flash chips with addresses during said DMA transfer, setting the initial value of said address, and incrementing said address after every DMA transfer cycle.

7. A system for improving performance of flash storage media, comprising:
   i. a plurality of flash memory chips for storing data;
   ii. a plurality of flash memory controllers for controlling said flash memory chips;
   iii. at least one micro-controller for activating said flash memory chips and said flash controller's control and data signals;
   said flash memory chips being connected to said flash memory controllers such that at least two said flash memory chips are connected to at least two separate said flash controllers, thereby enabling an improvement in data transfer performance.

8. The system of claim 7, wherein said plurality of flash memory controllers are combined to form at least one multi-controller.

9. A method for improving write performance of flash storage systems, comprising:
   i. checking the status of a flash chip attached to a first flash controller;
   ii. if said attached flash chip is not yet in Ready state, because of a previously given page programming command, waiting until said flash chip becomes Ready;
   iii. transferring data to said flash chip;
   iv. starting a programming operation on said flash memory chip;
   v. checking said status of a flash chip attached to a second flash controller;

vi. if said attached flash chip is not yet in Ready state, because of a previously given page programming command, waiting until said flash chip becomes Ready;

vii. transferring the data to said flash chip;

viii. starting a programming operation on said flash memory chip; and ix. continuing above-described operations on said flash chips attached to remaining flash controllers.

10. The method of claim 9, further comprising, after steps (ii.) and (vi.), receiving and recording the status of the completed programming operation.

11. The method of claim 9, further comprising, after step (vii.), transferring to the flash chip data selected from the group consisting of error-correction and error-detection information.

12. The method of claim 9, further comprising, after step (vii.), transferring to the flash chip mapping information used by the flash storage system to map the logical and physical addressing of the user data.

13. The method of claim 9, further comprising, after all data has been transferred, awaiting completion of said programming on said flash chips which have been written into.

14. The method of claim 13, further comprising receiving and recording the status of said flash chips.

15. A method for improving read performance of flash storage systems, comprising:

i. sending a read command to a flash chip attached to a first flash controller;

ii. sending said read command to a flash chip attached to a next flash controller;

iii. waiting until data is ready to be transferred from said flash chip attached to said first flash controller;

iv. transferring data from said flash chip;

v. repeating stages (ii.)-(iv.) for flash chips attached to remaining flash controllers.

16. The method of claim 15, further comprising, after step (iv.), performing ECC verification and correction, and recording obtained status of data from ECC circuitry.

17. A system for improving copy performance of flash storage systems, comprising:

i. at least two flash memory chips for storing data;

ii. at least two flash controllers for controlling said flash memory chips, at least one of said flash controllers having DMA interfaces comprising an output DMA REQUEST signal, which is activated whenever said controller(s) are ready to execute new data transfers; and iii. at least one micro-controller for activating said flash memory chips and said flash controller's control and data signals;

said flash memory chips being connected to said flash memory controllers such that at least two said flash memory chips are connected to at least two separate said flash controllers.

18. A method for improving copy performance of flash storage systems, comprising:

i. sending a read command to a flash chip attached to a first flash controller;

ii. setting up a DMA capable flash controller and a system DMA controller for performing a DMA transfer from said flash chip;

iii. waiting until data is ready to be transferred from said flash chip attached to said first flash controller;

iv. transferring said data from said flash chip, to a flash chip attached to a second flash controller, using said DMA transfer;

v. starting a programming operation on said flash memory chip that received said data;

vi. waiting for completion of said programming operation.

19. The method of claim 18, further comprising, after step (iv.), performing ECC verification and correction, and recording the status of obtained data, wherein if a data correction is required, the following steps are executed:

i) aborting said transfer operation to said chip attached to said second flash controller, by sending a Reset command;

ii) reading data to a RAM buffer by sending a Read command to said flash chip attached to the said first flash controller, waiting for said flash chip to become Ready, and transferring said data to said RAM buffer;

iii) correcting said data in said RAM buffer;

iv) starting a new transfer operation to said chip attached to said second flash controller, and transferring to said chip the corrected data from said RAM buffer; and v) continuing with step (v.) of claim 16.

20. The method of claim 18, further comprising, after step (iv.), receiving and recording status of said programming operation.

21. The method of claim 18, further comprising, after step (iv.), transferring to the flash chip data selected from the group consisting of error-correction and error-detection information.

22. The method of claim 18, further comprising, after step (iv.), transferring to the flash chip mapping information used by the flash storage system to map the logical and physical addressing of the user data.

23. The method of claim 18, further comprising, repeating said operations for flash chips attached to all flash memory controllers, such that at least one of said flash controllers participating in each operation should be DMA-capable.

24. A system for improving copy performance of flash storage systems, comprising:

i. at least three flash memory chips for storing data;

ii. at least three flash controllers for controlling said flash memory chips, such that at least two of said flash controllers have DMA interfaces comprising of an output DMA REQUEST signal, which is activated whenever said controllers are ready to execute a new data transfer; and iii. at least one micro-controller for activating said flash memory chips and said flash controller's control and data signals;

said flash memory chips being connected to said flash memory controllers such that at least three said flash memory chips are connected to at least three separate said flash controllers.

25. A method for improving copy performance of flash storage systems, comprising:

i. checking the status of a flash chip attached to a first flash controller;

ii. if said attached flash media is not yet in Ready state, because of a previously given page programming command, waiting until said flash media becomes Ready;

iii. sending a read command to said flash chip;

iv. setting up a DMA capable flash controller and system DMA controller for performing a DMA transfer from said flash chip;

v. waiting until data is ready to be transferred from said flash chip;

vi. transferring said data from said flash chip to a flash chip attached to a second flash controller, using said DMA transfer;

vii. starting a programming operation on said flash memory chip which received said data; and viii. continuing above operations on flash chips attached to remaining flash controllers, while increasing number of 'source' and 'destination' flash controller cyclically by 1.

26. The method of claim 25, further comprising after all said data has been transferred, waiting for completion of said programming on flash chips that have been written into.

27. The method of claim 26, further comprising receiving and recording status of said programming operations.

28. The method of claim 25, further comprising, after step (ii.), receiving and recording status of said programming operation.

29. The method of claim 25, further comprising, after step (v.), performing ECC verification and correction, and recording the status of obtained data, wherein if data correction is required, the following steps are executed:

i) aborting said transfer operation to said chip attached to said second flash controller, by sending a Reset command;

ii) reading data to a RAM buffer by sending a Read command to said flash chip attached to the said first flash controller, waiting for said flash chip to become Ready, and transferring said data to said RAM buffer;

iii) correcting said data in said RAM buffer;

iv) starting a new transfer operation to said chip attached to said second flash controller, and transferring to said chip the corrected data from said RAM buffer; and v) continuing further operation according to step (vi.) of claim 25.

30. The method of claim 25, further comprising, after step (v.), transferring to the flash chip the data selected from the group consisting of error-correction and error-detection information.

31. The method of claim 25, further comprising, after step (v.), transferring to the flash chip mapping information used by the flash storage system to map the logical and physical addressing of the user data.

* * * * *